Oct. 5, 1965  P. GOUIN  3,210,120

TILTING BODY DUMP VEHICLE

Filed July 31, 1961  4 Sheets-Sheet 1

INVENTOR
PAULETTE GOUIN
BY Irwin S. Thompson
ATTY.

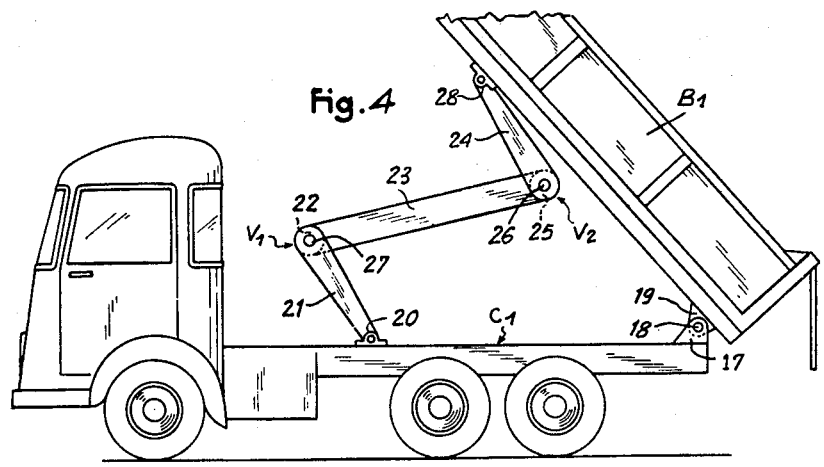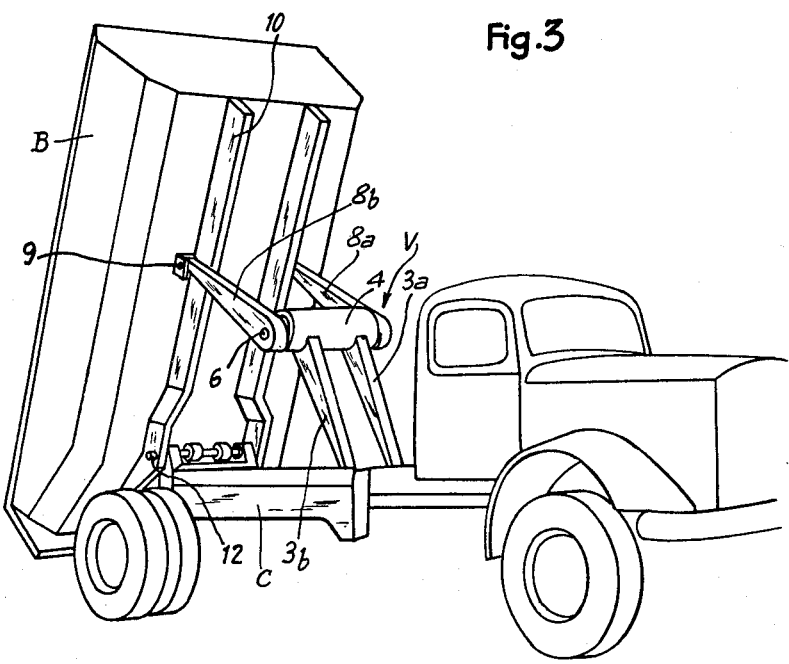

INVENTOR
PAULETTE GOUIN
BY Irwin S. Thompson
ATTY.

Oct. 5, 1965 P. GOUIN 3,210,120

TILTING BODY DUMP VEHICLE

Filed July 31, 1961 4 Sheets-Sheet 4

INVENTOR
PAULETTE GOUIN
By Irvin S. Thompson
ATTY.

United States Patent Office 3,210,120
Patented Oct. 5, 1965

3,210,120
TILTING BODY DUMP VEHICLE
Paulette Gouin, 7 Square de la Dordogne, Paris, France
Filed July 31, 1961, Ser. No. 128,013
Claims priority, application France, Aug. 4, 1960,
PV 834,988; Oct. 20, 1960, PV 841,709; Nov 19, 1960,
PV 844,420; May 4, 1961, PV 860,751
2 Claims. (Cl. 298—22)

The present invention relates to vehicles having a chassis on which a load-carrying body is pivotally connected for vertically swinging movement between a lowered or rest position and a raised or tilted position, and to the mechanism for effecting such vertically swinging movement of the load-carrying body.

The present invention is somewhat similar to that shown in my copending application Serial No. 127,214, filed July 27, 1961, now abandoned.

I have illustrated, by way of example, in the accompanying drawings, a preferred embodiment of my invention. In said drawings:

FIG. 3 is a partial perspective view of the arrangement illustrated in FIG. 1.

FIG. 4 is a diagrammatic elevational view of a vehicle carrying a swinging or tiltable body and provided with a raising mechanism including two arms pivotally secured to the opposite ends of a medial arm.

Figure 1:
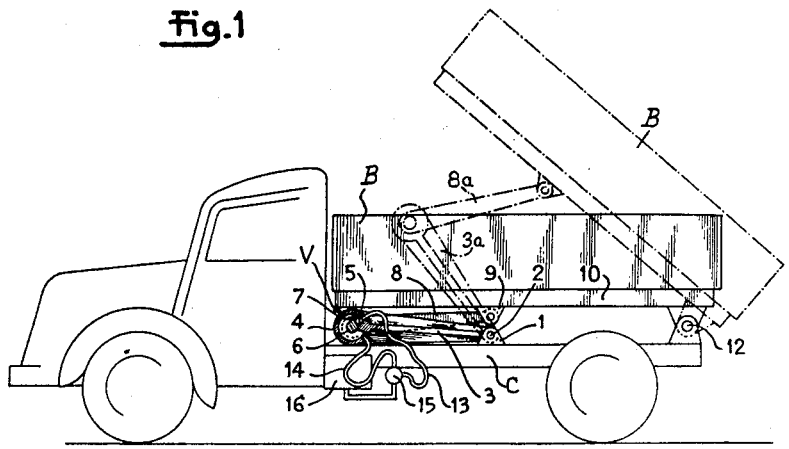
FIG. 1 is a somewhat diagrammatic elevational view of a vehicle having a vertically swinging load-carrying body and a raising mechanism therefore.

Turning first to the embodiment illustrated in FIGS. 1 and 3, the vehicle includes in the area located preferably to the front of the center of loading of its chassis C, bearings 1 inside which rotates a shaft 2 to which are pivotally secured arm means 3 comprising two arms $3a$, $3b$, and the outer ends of which are rigid with the cylinder 4 of a rotary jack V. Said cylinder includes an inner radial partition 5 inside which is rotatably carried a shaft 6 cooperating in fluid-tight relationship with said partition and provided with a radial blade 7 cooperating also in fluid-tight relationship with the inner walls of the cylinder and of the covers of the latter. Said shaft passes in fluid-tight relationship at its ends through bearings carried by the covers of the cylinder and it rotates in unison with arm means 8 comprising two arms $8a$ and $8b$ rotatably carried by bearings 9 secured to an intermediate chassis 10 carrying a body B adapted to swing about an axis 12. The cylinder 4 of the jack is furthermore connected in any manner known per se for such liquid operated jacks, say through pipes 13 and 14, with pump means 16 through the agency of a distributor valve 15 including control gates.

If it is desired to make the body swing into the position illustrated in dot-and-dash lines in FIG. 1, it is sufficient to operate the distributor valve 15 so as to send liquid under pressure through the pipe 13 into the cylinder 4 between the radial partition 5 and the blade 7. This leads to a rotary movement of the shaft 6 with reference to the cylinder 4 and, consequently, to a relative opening of the arms $3a$, $3b$ and $8a$, $8b$, which produces a swinging of the body B around its axis 12. The reverse operation of the distributor valve 15 closes the pipe 13 and opens the pipe 14, so as to return the body B into a horizontal or road position through a return of the liquid towards the pump means under the action of the actual weight of the body.

The embodiment illustrated in FIG. 2 differs from that which has been illustrated and described with reference to FIG. 1 through the fact that the pivotal axes 52 and 59 of the raising arms 53 and 58 are located near the front of the body 61 in an area adjacent the cab. This leads, with reference to the preceding embodiment, to a substantial shifting of the points of application 52 and 59 of the levers constituted by the dual raising arms 53 and 58, since said points 52 and 59 are further away from the swinging axis 62 of the body 61. Said arrangement is of particular interest when the vehicle is intended for the transportation and handling of heavy materials, since the liquid pressure required for swinging the body is smaller than if the points of application of the lever are nearer the swinging axis.

In the embodiment illustrated in FIG. 4, the vehicle includes a chassis $C_1$ carrying in its rear section bearings 17 inside which may tilt, around the axes 18, bearings 19 rigid with a body $B_1$. On the girders of the chassis $C_1$ are furthermore fitted bearings 20 inside which are rotatably carried parallel arms 21 rigid with the shaft 27 of a rotary jack $V_1$ of which the cylinder 22 is rigid with one of the ends of the intermediate arms 23, the other ends of which are rigid with the cylinder 25 of a second jack $V_2$, of which the shaft 26 is in its turn rigid through its ends with the arms 24 rotatably carried in the bearings 28 rigid with the body $B_1$.

Figure 2:
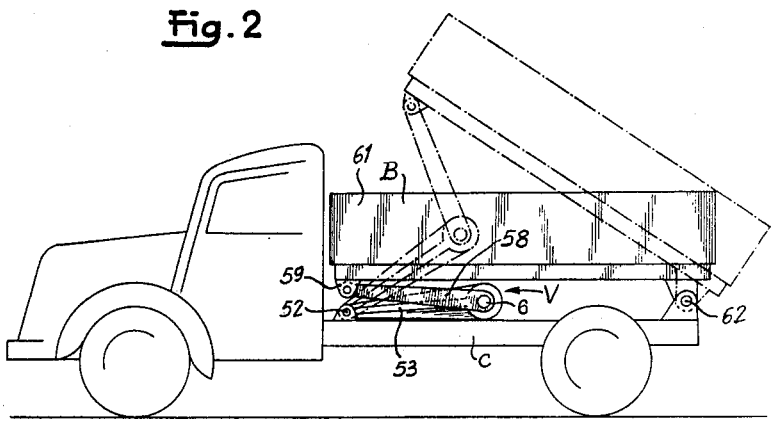
FIG. 2 is a view similar to FIG. 1 but showing a modified form of the invention.

Each of the jacks $V_1$, $V_2$ is of the same type as the rotary jack illustrated in FIGS. 1 to 3 and it is controlled in the same manner by pump means with which the said jack is connected through pipes and a distributor valve which are not illustrated.

By making the liquid under pressure flow through said pipes, said liquid will produce, as in the preceding cases, the angular movement of the jack shafts and this leads in its turn to the swing of the body through the relative openings of the arms 21–23, on the one hand, and 23 and 24, on the other hand. By setting the distributor valve in its exhaust position, the sole weight of the body is sufficient for it to return into its horizontal road position.

Figure 5:
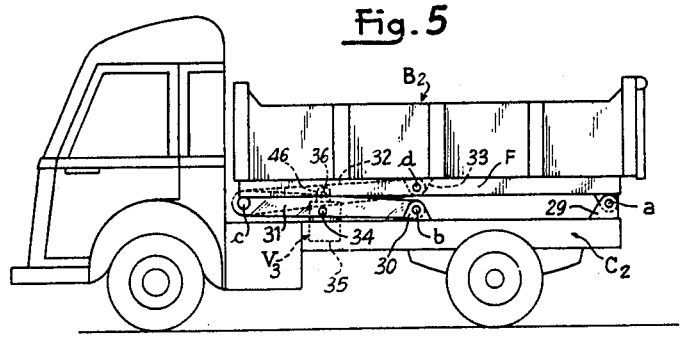
FIG. 5 is a view similar to FIGS. 1 and 2 but showing another embodiment of the present invention.
Figure 6:
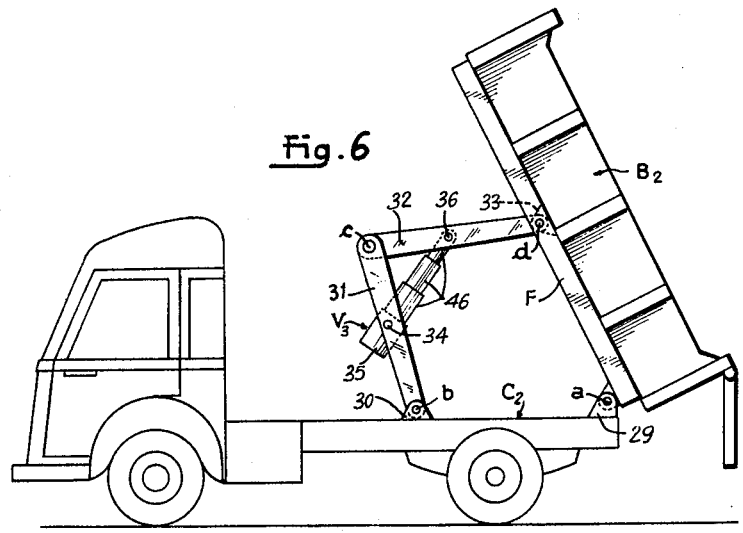
FIG. 6 is a view of the embodiment shown in FIG. 5 but with the load-carrying body in a raised position.

Turning now to the embodiment illustrated in FIGS. 5 and 6, the vehicle according to the present invention is illustrated in the form of a truck having a chassis $C_2$. Bearings 29 are mounted on the rear of chassis $C_2$ and are pivotally interconnected with an intermediate chassis F for vertical swinging movement of chassis F relative to chassis $C_2$ about a horizontal axis $a$. The vertically swinging load-carrying body $B_2$ is supported on chassis F. To the chassis $C_2$ and in an area located preferably to the front of the loading center of the vehicle are secured bearing support straps 30 rotatably carrying spindles $b$ to which the ends of the lower arms 31 are pivotally secured, said arms 31 being furthermore connected through the spindle $c$ to the upper arms 32 the outer ends of which are pivotally carried in the bearing support straps 33 as provided by the spindle $d$, the bearing support straps 33 being rigid with the intermediate chassis F carrying the body $B_2$. Between the lower arms 31, the cylinder 35 of a jack $V_3$ is adapted to swing about an axis 34. The hydraulic circuit of the fluid motor or jack $V_3$ is a conventional circuit fed by pump means and which has not been illustrated, the piston 46 of said jack $V_3$ being pivotally connected to the spindle 36 extending between the upper arms 32.

I obtain thus a four-sided system having its apices at $a$, $b$, $c$, and $d$, said system being deformable under the action of the thrust exerted by the jack $V_3$ acting to open the sides $bc$ and $cd$ about their common apex $c$. Said sides, as they open, cause the apex $d$ to describe an arc of a circle having for its cente $a$, thereby to effect vertically swinging movement of the load-carrying body.

Figure 7:
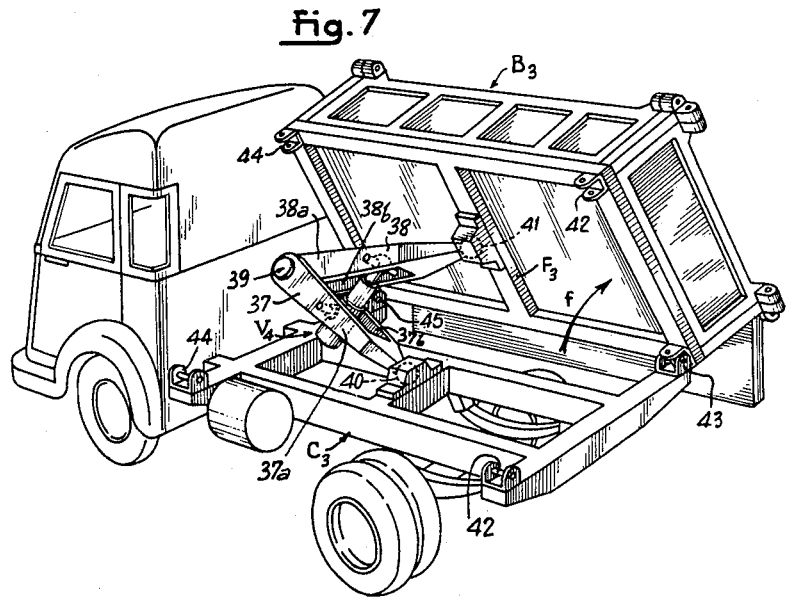
FIG. 7 is a perspective view of a vehicle provided with an arrangement similar to that of FIGS. 5 and 6, which allows the swinging of the body around three sides of the vehicles selectively.

According to a modification illustrated in FIG. 7, the ends of the arms 37 and 38 opposed to their common pivot at 39, are respectively rigid with a ball 40 carried inside a casing secured to the chasis $C_3$ and with a ball 41 carried inside a casing secured to the intermediate chassis $F_3$ rigid with the body. It will be remarked that the arms 37 and 38 form twin arms 37$a$, and 37$b$ and 38$a$, 38$b$.

The body is carried at its rear end by two universal or Cardan joints 42, 43 each including two spindles respectively parallel and perpendicular to the axis of the chassis, while the front end of the body is carried by two pivotal connections 44, 45 including each a spindle parallel with the axis of the chassis, each of said joints and connections being adapted to be locked when desired so that, upon release for instance of the pivotal axes at 42 and 44, the arms 37 and 38, when subjected to the thrust of the jack $V_4$ open and produce a lateral tilting in the direction of the arrow $f$ around the pivotal axes 43 and 45.

A symmetrical operation may be executed and the swinging performed along the other side of the vehicle chassis while a release of the pivotal connections 44 and 45 to the front of the vehicle chassis will allow a rearward tilting, the rear pivotal connections 42 and 43 being of course locked. Obviously, it is possible to replace with advantage the balls 40 and 41 by universal or Cardan joints similar to the Cardan joints 42 and 43.

It will be remarked, that in the various embodiments described the angular amplitude of tilting is particularly large and is associated with a very small bulk of the raising mechanism when the vehicle is in its road position.

What I claim is:

1. A vehicle having a chassis, a body pivotally mounted on the chassis for movement between a rest position and a tilted position, a raising mechanism for the body comprising a first link having one end pivotally connected to the chassis a substantial distance from the pivotal connection of the body to the chassis, a second link having one end pivotally connected to the body at substantially the same position as the pivotal connection of the first link to the chassis of said pivotal connection of the chassis to the body, said first and second links being directly pivotally interconnected at the other ends thereof, each link being substantially rectilinear between its two connections and having substantially the same length, fluid motor means in the form of a telescopic jack having a cylinder directly pivotally interconnected with one link and a piston directly pivotally interconnected with the other link substantially equal distances from the pivotal interconnection of the two links with each other to pivotally move the links apart from each other to pivot the body to the tilted position and to allow the links to lie adjacent each other when the body is in rest position, and means for operating the fluid motor.

2. A vehicle as claimed in claim 1, in which the pivotal connections of the fluid motor are disposed substantially in line with the pivotal connections of the ends of the links.

References Cited by the Examiner

UNITED STATES PATENTS

| 1,246,236 | 11/17 | Cox | 298—11 |
| 1,452,501 | 4/23 | Gasser | 298—11 |
| 1,705,892 | 3/29 | Ballert | 298—17.7 |
| 1,974,775 | 9/34 | Gorsuch | 298—22 X |
| 1,991,634 | 2/35 | Silver | 298—22 X |
| 2,180,066 | 11/39 | Porter | 298—17.7 X |
| 2,588,489 | 3/52 | Day | 298—22 |
| 2,698,199 | 12/54 | Godbersen | 298—22 |
| 2,825,307 | 3/58 | Enyeart | 60—520 |
| 2,963,185 | 12/60 | Jones | 298—22 X |

FOREIGN PATENTS

| 147,564 | 7/52 | Australia. |
| 970,073 | 9/35 | France. |
| 916,939 | 9/46 | France. |

ARTHUR L. LA POINT, *Primary Examiner.*

LEO QUACKENBUSH, MILTON BUCHLER,
*Examiners.*